United States Patent
Schlosser et al.

(10) Patent No.: US 6,344,158 B1
(45) Date of Patent: Feb. 5, 2002

(54) FLAME RETARDANT COMBINATIONS FOR THERMOPLASTIC POLYMERS II

(75) Inventors: Elke Schlosser; Bernd Nass, both of Augsburg; Wolfgang Wanzke, Meitingen, all of (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/496,023

(22) Filed: Jan. 29, 2000

(30) Foreign Application Priority Data

Jan. 30, 1999 (DE) ........................................ 199 03 709

(51) Int. Cl.$^7$ .............................................. C09K 21/00
(52) U.S. Cl. ........................................ 252/609; 524/116
(58) Field of Search ........................... 524/116; 252/609

(56) References Cited

U.S. PATENT DOCUMENTS

| | | | |
|---|---|---|---|
| 3,900,444 A | | 8/1975 | Racky et al. |
| 4,036,811 A | | 7/1977 | Noetzel et al. |
| 4,879,066 A | | 11/1989 | Crompton |
| 5,326,805 A | | 7/1994 | Sicken et al. |
| 5,684,071 A | * | 11/1997 | Mogami ..................... 524/100 |
| 5,780,534 A | | 7/1998 | Kleiner et al. |
| 5,900,446 A | * | 5/1999 | Nishihara ................... 524/127 |
| 6,087,423 A | | 1/2000 | Kleiner et al. |
| 6,207,736 B1 | | 3/2001 | Nass et al. |

FOREIGN PATENT DOCUMENTS

| | | |
|---|---|---|
| AU | 711 202 | 1/1998 |
| DE | 22 52 58 | 3/1974 |
| DE | 24 47 727 | 4/1976 |
| DE | 196 14 424 | 10/1997 |
| DE | 197 08 726 | 9/1998 |
| DE | 197 34 437 | 2/1999 |
| DE | 197 37 727 | 7/1999 |
| EP | 0 287 293 | 10/1988 |
| EP | 0 452 755 | 10/1991 |
| EP | 0 584 567 | 3/1994 |
| EP | 0 699 708 | 3/1996 |
| EP | 0 794 191 | 9/1997 |
| EP | 794191 | * 9/1997 |
| EP | 0 899 296 | 3/1999 |
| WO | WO 97/39053 | 10/1997 |
| WO | 9739053 | * 10/1997 |

OTHER PUBLICATIONS

Cover page & page #2 of AU 81972/98 1998.
Derwent Patent Family Abstract for DE 19708726 Sep. 10, 1998.
US Application No. 09/141039 Aug. 27, 1998.
Riedel, Anorganische Chemie, 2$^{nd}$ edition, pp. 490–497, Walter de Gruyter, Berlin–New York 1990.
Ullmann's Encyclopedia of Industrial Chemistry, 5$^{th}$ edition, vol. A12, pp. 372–387 and 443–448, 1989.
Commerical Ceramic Clays, vol. 6, pp. 12–18, 1996.
Abstract of EP 0 899 296 Mar. 3, 1999.
EPO Seacrh Report for EP 00 10 0223; Apr. 28, 2000.

* cited by examiner

*Primary Examiner*—Margaret Medley
*Assistant Examiner*—Cephia D. Toomer
(74) *Attorney, Agent, or Firm*—Anthony A. Bisulca

(57) ABSTRACT

The invention relates to a flame retardant combination for thermoplastic polymers comprising, as component A, a salt of 1-hydroxydihydrophosphole oxides of formula (Ia) or formula (Ib) and/or 1-hydroxyphospholane oxides of formula (II),

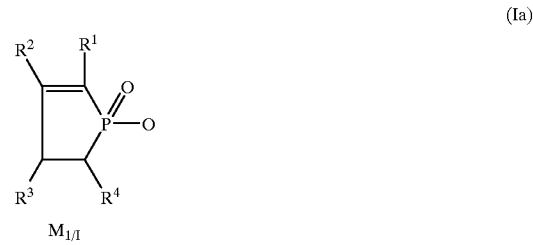
(Ia)

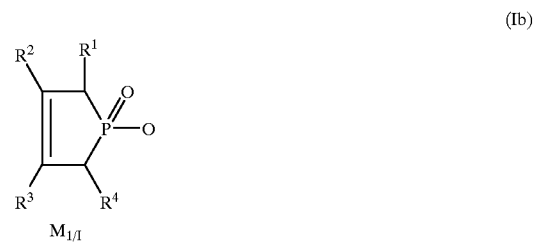

(Ib)

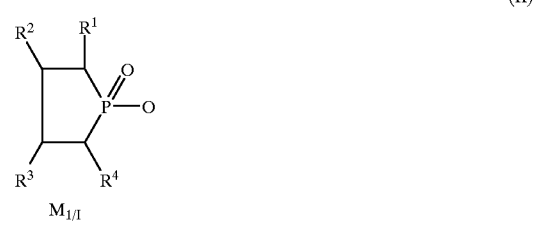

(II)

and, as component B, a synthetic inorganic compound and/or a mineral product.

10 Claims, No Drawings

FLAME RETARDANT COMBINATIONS FOR THERMOPLASTIC POLYMERS II

FIELD OF THE INVENTION

The invention relates to a flame retardant combination for thermoplastic polymers and the use thereof.

DESCRIPTION OF THE RELATED ART

The salts of phosphinic acids (phosphinates) have proven to be effective flame-retardant additives for thermoplastic polymers. This applies both to the alkali metal salts (DE-A-22 52 258) and to the salts of other metals (DE-A-24 47 727).

Calcium phosphinates and aluminum phosphinates have been described as particularly effective in polyesters and give less impairment of the material properties of the polymeric molding compositions than do the alkali metal salts (EP-A-0 699 708).

Alicyclic phosphinates, e.g. the salts of 1-hydroxyphospholane oxides, also have flame-retardant properties and are particularly suitable for polyesters and polyamides (EP-A-0 794 191).

Synergistic combinations of the phosphinates mentioned with certain nitrogen-containing compounds have also been found, and in a large number of polymers these are more effective flame retardants than the phosphinates alone (PCT/EP97/01664, and also DE-A-197 34 437 and DE-A-197 37 727).

SUMMARY OF THE INVENTION

Surprisingly, it has now been found that the flame-retardant effect of the various phosphinates in thermoplastic polymers can also be markedly improved by adding small amounts of inorganic compounds which do not contain nitrogen. It has moreover been found that the additives mentioned can also improve the flame-retardant effect of phosphinates in combination with nitrogen-containing synergists.

The invention therefore provides a flame retardant combination for thermoplastic polymers comprising, as component A, a salt of 1-hydroxydihydrophosphole oxides of formula (Ia) or formula (Ib) and/or 1-hydroxyphospholane oxides of formula (II),

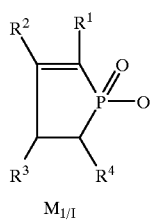

(Ia)

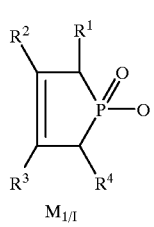

(Ib)

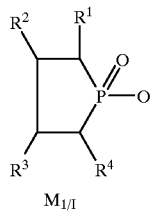

(II)

and, as component B, a synthetic inorganic compound and/or a mineral product.

DESCRIPTION OF THE PREFERRED EMBODIMENTS $R^1$ to $R^4$, which are identical or different, are preferably hydrogen or $C_1$–$C_4$-alkyl, linear or branched.

$R^1$ to $R^4$, which are identical or different, are particularly preferably methyl or ethyl.

The metal is preferably magnesium, calcium, zinc and/or aluminum.

Component B is preferably an oxygen compound of silicon, a magnesium compound, a metal carbonate of metals of the second main group of the Periodic Table, red phosphorus, a zinc compound or an aluminum compound.

The oxygen compounds of silicon are preferably salts or esters of orthosilicic acid and condensation products thereof, silicates, zeolites, silicas, glass powders, glass-ceramic powders or ceramic powders.

The magnesium compounds are preferably magnesium hydroxide, hydrotalcites, magnesium carbonates or magnesium calcium carbonates.

The red phosphorus is preferably elemental red phosphorus or a preparation in which the surface of the phosphorus has been coated with low-molecular-weight liquid substances, such as silicone oil, paraffin oil or esters of phthalic acid or adipic acid, or with polymers or oligomeric compounds, e.g. with phenolic resins or amino plastics, or else with polyurethanes.

The zinc compounds are preferably zinc oxide, zinc stannate, zinc hydroxystannate, zinc phosphate, zinc borate or zinc sulfides.

The aluminum compounds are preferably aluminum hydroxide or aluminum phosphate.

The novel flame retardant combination preferably comprises, as further component C, nitrogen compounds.

The nitrogen compounds preferably have the formulae (III) to (VIII) or are mixtures of these

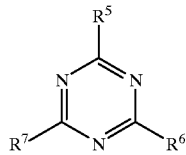

(III)

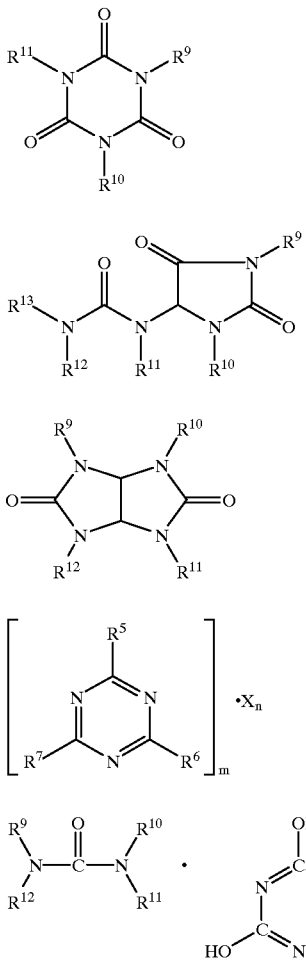

or the nitrogen compounds are oligomeric esters of tris (hydroxyethyl) isocyanurate with aromatic polycarboxylic acids or are nitrogen-containing phosphates of the formula $(NH_4)_yH_{3-y}PO_4$ or $(NH_4PO_3)_z$, where y is from 1 to 3 and z is from 1 to 10,000.

Component C is preferably benzoguanamine, tris (hydroxyethyl) isocyanurate, allantoin, glycoluril, melamine, melamine cyanurate, melamine phosphate, dimelamine phosphate and/or melamine pyrophosphate.

The invention further provides the use of the novel flame retardant combination for rendering thermoplastic polymers flame-retardant. For the purposes of the present invention and as set out by Hans Domininghaus in "Die Kunststoffe und ihre Eigenschaften" [Plastics and their Properties], 5th edition (1998), p. 14, thermoplastic polymers are polymers in which the molecular chains have no lateral branching or else have varying numbers of lateral branches of different lengths, soften on heating and can be shaped in virtually any way desired.

These thermoplastic polymers are preferably HI (high-impact) polystyrene, polyphenylene ethers, polyamides, polyesters, polycarbonates or blends or polymer blends of ABS (acrylonitrile-butadiene-styrene) type or of PC/ABS (polycarbonate/acrylonitrile-butadiene-styrene) type. HI polystyrene is a polystyrene with increased impact strength.

Particularly preferred thermoplastic polymers are polyamides, polyesters and ABS.

The term plastic molding compositions is used below for thermoplastic polymers which comprise the novel flame retardant combinations and, if desired, fillers and reinforcing materials and/or other additives as defined below. The component B which has been mentioned earlier is a synthetic inorganic compound and/or a mineral product selected from the groups mentioned below:

Oxygen compounds of silicon, such as salts or esters of orthosilicic acid and condensation products thereof (silicates). An overview of suitable silicates is given, for example, by Riedel in Anorganische Chemie, 2nd edn., p. 490–497, Walter de Gruyter, Berlin-N.Y., 1990. Of particular interest here are phyllosilicates (laminar or layer silicates) such as talc, kaolinite and mica, and the group comprising the bentonites and montmorillonites, and also tectosilicates, e.g. the group comprising the zeolites. Besides these, it is also possible to use silicon dioxide in the form of finely dispersed silica.

The silica here may have been prepared pyrogenically or by a wet chemical process. The silicates and silicas mentioned may have been provided with organic modifiers in order to achieve certain surface properties.

Other components B which may be used are glass powders, glass-ceramic powders and ceramic powders with a variety of makeups, e.g. as described in "Ullmann's Encyclopedia of Industrial Chemistry," 5th edition, Vol. A 12 (1989), pp. 372–387 (Glass) and pp. 443–448 (Glass-ceramics). Appropriate ceramic materials are described in Vol. 6 (1986) on pp. 12–18 (Commercial Ceramic Clays). It is possible to use either glasses and/or ceramics with defined melting points or else mixtures of products with a broad melting range, such as ceramic frits as used for preparing glazes. Frits of this type, or mixtures of two or more frits, may also comprise glass fibers, basalt fibers or ceramic fibers. Mixtures of this type are described, for example, in EP 0 287 293 B1.

Other compounds which may be used as component B are magnesium compounds, such as magnesium hydroxide, or also hydrotalcites of the formula $$Mg_{(1-a)}Al_a(OH)_2A_{a/2} \cdot pH_2O,$$

where

A is an anion $SO_4^{2-}$ or $CO_3^{2-}$, a is greater than 0 and equal to or less than 0.5, and p is the number of water molecules in the hydrotalcite and is from 0 to 1.

Preference is given to hydrotalcites in which A is the anion $CO_3^{2-}$ and $0.2 \leq a \leq 0.4$. The hydrotalcites may be either naturally occurring hydrotalcites, which may, if desired, have been modified by an appropriate chemical treatment, or synthetically prepared products.

Other compounds which may be used as component B are metal carbonates of metals of the second main group of the Periodic Table and mixtures of these.

Suitable compounds are magnesium calcium carbonates ($b_1$) of the formula $$Mg_bCa_c(CO_3)_{b+c} \cdot qH_2O,$$

where b and c are numbers from 1 to 5 and $b/c \geq 1$ and $q \geq 0$, and basic magnesium carbonates ($b_2$) of the formula $$Mg_d(CO_3)_e(OH)_{2d-2e} \cdot rH_2O,$$

where d is a number from 1 to 6, e is a number greater than 0 and smaller than 6 and d/e>1 and $r \geq 0$. Particularly suitable mixtures are those made from $b_1$ and $b_2$, where the ratio of amounts $b_1:b_2$ is in the range from 1:1 to 3:1. The magnesium calcium carbonates $b_1$ and basic magnesium carbonates $b_2$ may be used either in hydrated or anhydrous form, with or without surface treatment. These types of compound include the naturally occurring minerals, such as huntite ($b_1$) and hydromagnesite ($b_2$) and mixtures of these.

Other compounds which may be used as component B are zinc compounds, such as zinc oxide, zinc stannate, zinc hydroxystannate, zinc phosphates and zinc sulfides, and also zinc borates of the formula $$f\ ZnO \cdot gB_2O_3 \cdot hH_2O,$$

where f, g and h are from 0 to 14.

If desired, the novel flame retardant combinations may comprise, as component C, a nitrogen compound of the formulae (III) to (VIII) or a mixture of the compounds indicated by the formulae and described in DE-A-197 37 727, which is expressly incorporated herein by way of reference.

In addition to the abovementioned, components C which may be used are oligomeric esters of tris(hydroxyethyl) isocyanurate with aromatic polycarboxylic acids, as described in EP-A 584 567, and nitrogen-containing phosphates of the formula $(NH_4)_y H_{3-y} PO_4$ or $(NH_4PO_3)_z$, where y may be from 1 to 3 and z is any desired number (for example from 1 to 10,000), typically also given as an average of a chain length distribution.

Suitable polymers in which the novel flame retardant combination can be used effectively are also described on pages 6 to 9 of International Patent Application PCT/WO 97/01664, which is expressly incorporated herein by way of reference.

Components A which may be used are: salts of 1-hydroxydihydrophosphole oxides and of 1-hydroxyphospholane oxides.

Examples of suitable salts of 1-hydroxydihydrophosphole oxides and of 1-hydroxyphospholane oxides are: the alkaline-earth, magnesium, zinc or aluminum salts of 1-hydroxy-3-alkyl-2,3-dihydro-1H-phosphole 1-oxide, 1-hydroxy-3-methyl-2,5-dihydro-1H-phosphole 1-oxide, 1-hydroxy-2,3-dihydro-1H-phosphole 1-oxide, 1-hydroxy-2,5-dihydro-1H-phosphole 1-oxide, 1-hydroxy-1H-phospholane 1-oxide and 1-hydroxy-3-methyl-1H-phospholane 1-oxide, and also mixtures of these salts. The aluminum salts are preferred.

The salts may be prepared from the 1-hydroxydihydrophosphole oxides and 1-hydroxyphospholane oxides by known methods, and the metal carbonates, metal hydroxides or metal oxides may be used here in aqueous solution. The 1-hydroxydihydrophosphole oxides are accessible by known methods from the 1-chlorodihydrophosphole oxides, which may be prepared, for example, as in EP-A-0452755. The 1-hydroxyphospholane oxides may be prepared from these by hydrogenation.

The amount of the salts of the 1-hydroxydihydrophosphole oxides or of the 1-hydroxyphospholane oxides of the general formulae Ia, Ib and, respectively, II which is to be added to the polymer may vary within wide boundaries. Use is generally made of from 1 to 50% by weight, based on the plastic molding composition. The ideal amount depends on the nature of the polymer, the nature of component B and of C if used, and on the type of the salt used of the 1-hydroxydihydrophosphole oxide or of the 1-hydroxyphospholane oxide itself, and may readily be determined experimentally. From 3 to 40% by weight, in particular from 5 to 30% by weight, is preferred.

The salts of the 1-hydroxydihydrophosphole oxides and of the 1-hydroxyphospholane oxides according to the invention may be used in a variety of physical forms, depending on the type of the polymer used and on the properties desired. For example, the salts of the 1-hydroxydihydrophosphole oxides and of the 1-hydroxyphospholane oxides may be finely ground to achieve better dispersion in the polymer. If desired, it is also possible to use a mixture of different salts of the 1-hydroxydihydrophosphole oxides and of the 1-hydroxyphospholane oxides.

The salts of the 1-hydroxydihydrophosphole oxides and of the 1-hydroxyphospholane oxides according to the invention are thermally stable and neither decompose the polymers during processing nor affect the production process for the plastic molding composition.

The salts of the 1-hydroxydihydrophosphole oxides and of the 1-hydroxyphospholane oxides are nonvolatile under the conditions for preparing and processing polymers.

The amount of the inorganic compounds according to the invention (component B) to be added to the polymers may vary within wide limits. The amount used is generally from 0.1 to 10% by weight, based on the plastic molding composition. The ideal amount depends on the nature of the polymer, on the nature of the salt of the 1-hydroxydihydrophosphole oxides and of the 1-hydroxyphospholane oxides (component A) used, on any nitrogen-containing compound (component C) used, and also on the type of the inorganic compound itself. From 0.3 to 5% by weight is preferred, in particular from 0.5 to 3% by weight. It is also possible to add a combination of the inorganic compounds mentioned.

The amount of nitrogen compound (component C) to be added to the polymers may vary within wide limits. The amount generally used is from 1 to 30% by weight, based on the plastic molding composition. The ideal amount depends on the nature of the polymer, on the nature of the salt of the 1-hydroxydihydrophosphole oxides and of the 1-hydroxyphospholane oxides (component A) used, on the nature of the inorganic compound (component B) used, and also on the type of the nitrogen compound itself. From 3 to 20% by weight is preferred, in particular from 5 to 15% by weight.

The flame-retardant components A and B and, if desired, C may be incorporated into thermoplastic polymers by, for example, premixing all of the constituents in powder and/or pellet form in a mixer and then homogenizing these in the polymer melt in a compounding apparatus (e.g. a twin-screw extruder). The melt is usually taken off as an extrudate, cooled and pelletized. The components A, B and C may also be introduced separately via a metering system directly into the compounding apparatus.

It is also possible to admix the flame-retardant additives A, B and C with previously produced polymer pellets or polymer powder and to process the mixture directly on an injection molding machine to give moldings.

In the case of polyesters, for example, the flame-retardant additives A, B and C may also be added to the polyester melt straight away during the polycondensation.

Besides the novel flame retardant combination made from A, B and, if used, C, fillers and reinforcing materials may also be added to the molding compositions, for example glass fibers, glass beads, or minerals, such as chalk. The molding compositions may also comprise other additives, such as antioxidants, light stabilizers, lubricants, colorants, nucleating agents or antistats. EP-A-584 567 gives examples of the additives which can be used.

The flame-retardant plastic molding compositions are suitable for producing moldings, films, filaments and fibers, e.g. by injection molding, extrusion or pressing.

EXAMPLES

1. Components Used
Commercially Available Polymers (Pellets)

| | |
|---|---|
| Nylon-6 (glass-reinforced nylon-6) | ® Durethan BKV 30 (Bayer AG, Germany) comprises 30% of glass fibers |
| Polybutylene terephthalate (glass-reinforced PBT) | ® Celanex 2300 GV 1/30 (Hoechst ® Celanese, USA) comprises 30% of glass fibers |

Flame Retardant Components (Pulverulent)
Component A
  Aluminum salt of 1-hydroxy-1H-phospholane 1-oxide, termed PHOLAL below.
Component B
  CEEPREE (glass-ceramic mixture), Brunner Mond & Co. Ltd., UK DHT Exm 697-2 (dihydrotalcite), Süd-Chemie AG, Germany FIREBRAKE® ZB (zinc borate), US Borax & Chemical Corporation, USA Zinc oxide, MERCK, Germany
Component C
  Melapur® MC (melamine cyanurate), DSM Melapur, The Netherlands 2. Preparation, Processing and Testing of Flame-retardant Plastic Molding Compositions The flame retardant components were mixed with the polymer pellets and any additives, in the ratios given in the tables, and incorporated in a twin-screw extruder (Leistritz LSM 30/34) at temperatures of from 230 to 260° C. (GR PBT) and, respectively, from 240 to 280° C. (GR nylon-6).

After sufficient drying, the molding compositions were injection molded (Toshiba IS 100 EN) at melt temperatures of from 240 to 270° C. (GR PBT) and, respectively, from 260 to 280° C. (GR nylon-6) to give test specimens and then tested and classified for flame retardancy using the (Underwriters Laboratories) UL 94 test.

Table 1 shows comparative examples in which the aluminum salts of the 1-hydroxy-1H-phospholane 1-oxide were tested as sole flame retardant components (component A) and, respectively, in combination with nitrogen-containing synergists (components A+C) in glass-fiber-reinforced PBT and, respectively, nylon-6.

Table 2 shows examples according to the invention in which the aluminum salt of the 1-hydroxy-1H-phospholane 1-oxide was tested on its own and, respectively, with nitrogen-containing synergists in combination with compounds effective in small amounts (components A+B and, respectively, components A+B+C) in glass-fiber-reinforced PBT and, respectively, in nylon-6. All quantities are given as % by weight and are based on the finished polymer compound including flame retardant.

It is apparent from the examples that the additives according to the invention (component B) combined with metal salts of the 1-hydroxydihydrophosphole oxides and of the 1-hydroxyphospholane oxides bring about a significant increase in flame retardancy, if admixed in appropriate amounts. There is also a considerable improvement to the flame-retardant effectiveness of synergistic combinations made from the metal salts of the 1-hydroxydihydrophosphole oxides and of the 1-hydroxyphospholane oxides and nitrogen-containing compounds (components A+C) when a certain amount of component B is added. The amount of flame retardant needed, based on the finished polymer compound, to achieve V-0, V-1 and, respectively, V-2 classification can be reduced when the combination A+B is used, compared with A on its own, and, respectively, when A+B+C is used, compared with A+C.

TABLE 1

Comparative examples. PHOLAL alone and in combination with nitrogen-containing synergists in glass-fiber-reinforced PBT and nylon-6.

| Polymer | PHOLAL [%] | Melamine cyanurate [%] | UL 94 classification (1.6 mm) |
|---|---|---|---|
| GR PBT | 20 | | V-1 |
| GR PBT | 25 | | V-1 |
| GR PBT | 10 | 10 | V-1 |
| GR nylon-6 | 20 | | V-2 |
| GR nylon-6 | 25 | | V-2 |
| GR nylon-6 | 11 | 11 | V-2 |

TABLE 2

Examples. PHOLAL alone and with nitrogen-containing synergists in combination with compounds effective in small amounts in glass-fiber-reinforced PBT and, respectively, nylon-6

| Polymer | PHOLAL [%] | Melamine cyanurate [%] | CEEPREE [%] | DHT Exm [%] | Zinc borate [%] | Zinc oxide [%] | UL 94 classification (1.6 mm) |
|---|---|---|---|---|---|---|---|
| GR PBT | 20 | | 2 | | | | V-0 |
| GR PBT | 20 | | | 1 | | | V-0 |
| GR PBT | 20 | | | | | | V-0 |
| GR PBT | 20 | | | | 1 | | V-0 |
| GR PBT | 20 | | | | | 1 | V-0 |
| GR PBT | 10 | 8 | | | 2 | | V-0 |
| GR nylon-6 | 20 | | | | 2 | | V-0 |
| GR nylon-6 | 10 | 10 | | | 2 | | V-0 |

What is claimed is:
1. A flame retardant combination for thermoplastic polymers comprising, as component A, a salt of 1-hydroxydihydrophosphole oxides of formula (Ia) or for- mula (Ib) and/or 1-hydroxyphospholane oxides of formula (II),

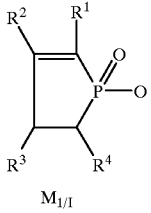
(Ia)

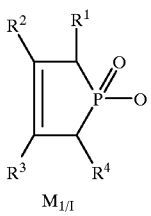
(Ib)

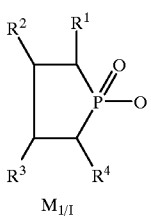
(II)

as component B, a synthetic inorganic compound and/or a mineral product selected from zeolites, ceramic powder, magnesium hydroxide, hydrotalcites, magnesium carbonates, magnesium calcium carbonates and other alkaline earth carbonates, zinc oxide, zinc stannate, zinc hydroxystannate, zinc phosphate, zinc borate, zinc sulfide, aluminum hydroxide, aluminum phosphate and red phosphorus, and, as component C, nitrogen compounds having the formulae (III) to (VIII) or are mixtures of these

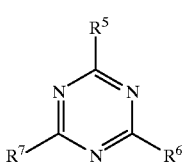
(III)

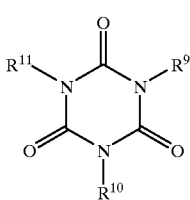
(IV)

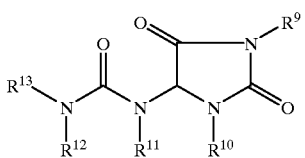
(V)

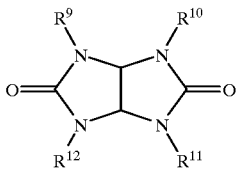
(VI)

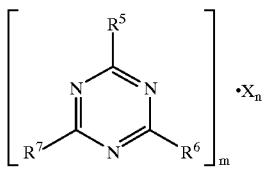
(VII)

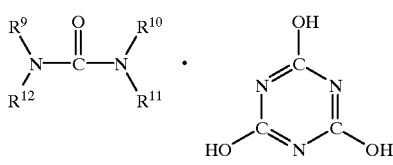
(VIII)

or the nitrogen compounds are oligomeric esters of tris (hydroxyethyl) isocyanurate with aromatic polycarboxylic acids or are nitrogen-containing phosphates of the formula $(NH_4)_y H_{3-y} PO_4$ or $(NH_4 PO_3)_z$, where y is from 1 to 2 and z is from 1 to 10,000.

2. A flame retardant combination as claimed in claim 1, wherein $R^1$ to $R^4$ are identical or different and are hydrogen and/or $C_1$–$C_4$-alkyl, linear or branched.

3. A flame retardant combination as claimed in claim 1, wherein $R^1$ to $R^4$ are identical or different and are methyl or ethyl.

4. A flame retardant combination as claimed in claim 1, wherein the metal is magnesium, calcium, zinc and/or aluminum.

5. The flame retardant combination as claimed in claim 1, wherein component C is benzoguanamine, tris (hydroxyethyl) isocyanurate, allantoin, glycouril, melamine, melamine cyanurate, melamine phosphate, dimelamine phosphate and/or melamine pyrophosphate.

6. A flame-retardant plastic molding composition comprising a flame retardant combination as claimed in claim 1.

7. The flame-retardant plastic molding composition as claimed in claim 6, wherein the polymers are polyamide, polyester or ABS.

8. A method for rendering thermoplastic polymers flame-retardant comprising incorporating a flame retardant combination as claimed in claim 1 into a thermoplastic polymer.

9. A method for rendering thermoplastic polymers flame-retardant according to claim 8 further comprising the step of selecting the thermoplastic polymer from HI (high-impact) polystyrene, polyphenylene ethers, polyamides, polyesters, acrylonitrile-butadiene-styrene (ABS), polycarbonates or blends or polymer blends of ABS type or of polycarbonate/acrylonitrile-butadiene-styrene (PC/ABS) type.

10. A method for rendering thermoplastic polymers flame-retardant according to claim 9 further comprising the step of supplying independently of one another each of components A and B at a concentration of from 1 to 30% by weight.

* * * * *